(12) United States Patent
Brelin, I

(10) Patent No.: US 8,010,665 B2
(45) Date of Patent: *Aug. 30, 2011

(54) METHOD OF AND APPARATUS FOR COMMUNICATING DATA STRUCTURES BETWEEN DEVICES IN A NETWORKING ENVIRONMENT

(75) Inventor: Jon Ebbe Brelin, I, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 55 days.

This patent is subject to a terminal disclaimer.

(21) Appl. No.: 12/488,245

(22) Filed: Jun. 19, 2009

(65) Prior Publication Data
US 2009/0259750 A1  Oct. 15, 2009

Related U.S. Application Data

(63) Continuation of application No. 11/095,828, filed on Mar. 30, 2005, now Pat. No. 7,565,427, which is a continuation of application No. 09/610,100, filed on Jun. 30, 2000, now Pat. No. 6,901,444.

(51) Int. Cl.
*G06F 15/173* (2006.01)
(52) U.S. Cl. ........ 709/224; 709/223; 709/232; 370/232; 370/531
(58) Field of Classification Search .......... 709/223, 709/224, 232; 370/232, 531
See application file for complete search history.

(56) References Cited

U.S. PATENT DOCUMENTS

| | | | |
|---|---|---|---|
| 4,780,821 A | 10/1988 | Crossley | |
| 5,077,732 A | 12/1991 | Fischer et al. | |
| 5,117,070 A | 5/1992 | Ueno et al. | |
| 5,367,679 A | 11/1994 | Khaira | |
| 5,394,522 A | 2/1995 | Sanchez-Frank et al. | |
| 5,422,883 A | 6/1995 | Hauris et al. | |
| 5,446,733 A | 8/1995 | Tsuruoka | |
| 5,471,474 A | 11/1995 | Grobicki et al. | |
| 5,499,018 A | 3/1996 | Welmer | |

(Continued)

FOREIGN PATENT DOCUMENTS

EP 0 577 054 A1 6/1993

(Continued)

OTHER PUBLICATIONS

Miyashita et al., "Real-Time DV Transmission on Hybrid Network with IEEE 1394 and ATM", WAM P1.10, Jun. 22, 1999, pp. 148-149.

(Continued)

*Primary Examiner* — Liangche A Wang
(74) *Attorney, Agent, or Firm* — Haverstock & Owens LLP

(57) ABSTRACT

An architecture, a system and a method monitors data structures over an IEEE 1394-1995 serial bus network. The data structures are portions of entries posted and stored to a descriptor mechanism. A resource request is submitted by a requesting control device to an AV/C resource schedule bulletin board subunit, where request data is stored and posted. The requesting control device submits a corresponding notify command data frame to the AV/C bulletin board subunit. When a competing control device performs a specified type of access activity on a specified data structure, the bulletin board subunit sends a notify response frame to the original requesting control device. The notify response frame provides an alert to the original requesting control device that the specified access activity has been performed on the specified data structure by a competing control device.

21 Claims, 10 Drawing Sheets

U.S. PATENT DOCUMENTS

| | | | |
|---|---|---|---|
| 5,500,934 A | | 3/1996 | Austin et al. |
| 5,548,722 A | | 8/1996 | Jalalian et al. |
| 5,555,413 A | | 9/1996 | Lohman et al. |
| 5,557,724 A | | 9/1996 | Sampat et al. |
| 5,574,867 A | | 11/1996 | Khaira |
| 5,682,489 A | | 10/1997 | Harrow et al. |
| 5,719,942 A | | 2/1998 | Aldred et al. |
| 5,724,646 A | | 3/1998 | Ganek et al. |
| 5,781,703 A | | 7/1998 | Desai et al. |
| 5,793,366 A | | 8/1998 | Mano et al. |
| 5,809,204 A | * | 9/1998 | Young et al. ............ 386/83 |
| 5,815,678 A | | 9/1998 | Hoffman et al. |
| 5,909,544 A | | 6/1999 | Anderson et al. |
| 5,920,701 A | | 7/1999 | Miller et al. |
| 5,933,430 A | | 8/1999 | Osakabe et al. |
| 5,991,520 A | | 11/1999 | Smyers et al. |
| 6,016,144 A | * | 1/2000 | Blonstein et al. ......... 715/791 |
| 6,055,641 A | | 4/2000 | Konaka et al. |
| 6,088,364 A | | 7/2000 | Tokuhiro |
| 6,094,681 A | | 7/2000 | Shaffer et al. |
| 6,133,938 A | | 10/2000 | James |
| 6,141,702 A | | 10/2000 | Ludtke et al. |
| 6,150,953 A | | 11/2000 | Tanaka et al. |
| 6,154,203 A | * | 11/2000 | Yuen et al. ............... 725/52 |
| 6,160,796 A | | 12/2000 | Zou |
| 6,169,725 B1 | | 1/2001 | Gibbs et al. |
| 6,216,110 B1 | * | 4/2001 | Silverberg ............. 705/9 |
| 6,233,611 B1 | | 5/2001 | Ludtke et al. |
| 6,237,049 B1 | | 5/2001 | Ludtke |
| 6,279,061 B1 | | 8/2001 | Aoki et al. |
| 6,288,716 B1 | | 9/2001 | Humpleman et al. |
| 6,292,624 B1 | | 9/2001 | Saib et al. |
| 6,359,557 B2 | | 3/2002 | Bilder |
| 6,363,434 B1 | | 3/2002 | Eytchison et al. |
| 6,370,688 B1 | | 4/2002 | Hejna, Jr. |
| 6,401,119 B1 | | 6/2002 | Fuss et al. |
| 6,424,361 B1 | * | 7/2002 | Chapuis ............. 715/854 |
| 6,438,110 B1 | | 8/2002 | Rai et al. |
| 6,466,971 B1 | | 10/2002 | Humpleman et al. |
| 6,498,895 B2 | * | 12/2002 | Young et al. ............ 386/83 |
| 6,513,064 B1 | | 1/2003 | Horiguchi et al. |
| 6,516,416 B2 | | 2/2003 | Gregg et al. |
| 6,522,654 B1 | | 2/2003 | Small |
| 6,564,295 B2 | | 5/2003 | Okabayashi et al. |
| 6,584,502 B1 | | 6/2003 | Natarajan et al. |
| 6,647,448 B1 | | 11/2003 | Brelin |
| 6,654,821 B1 | | 11/2003 | Aikawa et al. |
| 6,748,451 B2 | | 6/2004 | Woods et al. |
| 6,775,714 B1 | | 8/2004 | Miyano |
| 6,901,444 B1 | | 5/2005 | Brelin |
| 6,996,613 B1 | * | 2/2006 | Schroder ............. 709/224 |
| 7,188,073 B1 | * | 3/2007 | Tam et al. ............. 705/9 |
| 7,565,427 B2 | | 7/2009 | Brelin |
| 2001/0021194 A1 | | 9/2001 | Horiguchi et al. |
| 2002/0026540 A1 | | 2/2002 | Smyers |
| 2002/0196374 A1 | | 12/2002 | Barry et al. |

FOREIGN PATENT DOCUMENTS

| | | |
|---|---|---|
| EP | 0 631 247 A2 | 6/1994 |
| EP | 0 789 502 A2 | 8/1997 |
| EP | 0 812 092 A2 | 12/1997 |
| JP | 409326812 A | 12/1997 |

OTHER PUBLICATIONS

Igarashi et al., "Home Network File System for Home Network Based on IEEE-1394 Technology", IEEE Transactions on Consumer Electronics, Aug. 1, 1999, vol. 45, No. 3, pp. 1000-1003.

"P1394 Standard for a High Performance Serial Bus", IEEE Standards Department, Jul. 7, 1995, Draft 8.0, vol. 2, pp. 1-414.

Teener, Michael, "A Bus on a Diet-The Serial Bus Alternative an Introduction to the P1394 High Performance Serial Bus", Apple Computer, Inc. Feb. 24, 1992, pp. 316-321.

Blocks, R.H.J, "The IEEE-1394 High Speed Serial Bus" Phillip Journal of Research, vol. 50, No. 1/2, Jan. 1, 1996, pp. 209-216.

* cited by examiner

80

| | msb | | | | | | | lsb | |
|---|---|---|---|---|---|---|---|---|---|
| opcode | WRITE DESCRIPTOR (0A₁₆) | | | | | | | | |
| operand[0] | descriptor_specifier (MSB) | | | | | | | | ~81 |
| operand[1] | | | | | | | | | |
| : | : | | | | | | | | |
| : | (LSB) | | | | | | | | |
| : | subfunction | | | | | | | | ~83 |
| : | reserved | | | | | | | | |
| | node_ID (MSB) (LSB) | | | | | | | | ~82 |
| : | data_length (MSB) (LSB) | | | | | | | | ~84 |
| : | address (MSB) (LSB) | | | | | | | | ~79 |

| | msb | | | | | | | lsb | |
|---|---|---|---|---|---|---|---|---|---|
| opcode | WRITE DESCRIPTOR (07₁₆) | | | | | | | | |
| operand[0] | info_block_reference_path | | | | | | | | ~87 |
| : | | | | | | | | | |
| : | subfunction "partial_replace" = 50₁₆ | | | | | | | | ~89 |
| : | reserved | | | | | | | | |
| | node_ID (MSB) (LSB) | | | | | | | | ~86 |
| : | replacement_data_length (MSB) (LSB) | | | | | | | | ~88 |
| : | address (MSB) (LSB) | | | | | | | | ~189 |

| | msb | | | | | | lsb |
|---|---|---|---|---|---|---|---|
| opcode | READ DESCRIPTOR (09₁₆) | | | | | | |
| operand[0] | descriptor_specifier (MSB) | | | | | | ⎫ |
| operand[1] | ⋮ | | | | | | ⎬ ~91 |
| ⋮ | descriptor_specifier (LSB) | | | | | | ⎭ |
| ⋮ | node_ID (MSB) (LSB) | | | | | | ~93 |
| ⋮ | data_length (MSB) (LSB) | | | | | | ~92 |
| ⋮ | address (MSB) (LSB) | | | | | | ~94 |

| | msb | | | | | | lsb |
|---|---|---|---|---|---|---|---|
| opcode | READ INFO BLOCK (06₁₆) | | | | | | |
| operand[0] | info_block_reference_path | | | | | | ~97 |
| operand[1] | | | | | | | |
| ⋮ | node_ID (MSB) (LSB) | | | | | | ~99 |
| ⋮ | data_length | | | | | | ~96 |
| ⋮ | address | | | | | | ~98 |

*Fig. 9B*

METHOD OF AND APPARATUS FOR COMMUNICATING DATA STRUCTURES BETWEEN DEVICES IN A NETWORKING ENVIRONMENT

This Patent Application is a continuation application of U.S. patent application Ser. No. 11/095,828, filed on Mar. 30, 2005, now U.S. Pat. No. 7,565,427, and entitled "Method Of And Apparatus For Communicating Data Structures Between Devices In A Networking Environment," which is a continuation of U.S. patent application Ser. No. 09/610,100, filed on Jun. 30, 2000, and entitled "Method Of And Apparatus For Communicating Data Structures Between Devices In A Networking Environment," now issued as U.S. Pat. No. 6,901,444. The applications Ser. Nos. 11/095,828, filed on Mar. 30, 2005, and entitled "Method Of And Apparatus For Communicating Data Structures Between Devices In A Networking Environment" and 09/610,100, filed on Jun. 30, 2000, and entitled "Method Of And Apparatus For Communicating Data Structures Between Devices In A Networking Environment," now issued as U.S. Pat. No. 6,901,444 are hereby incorporated by reference.

FIELD OF THE INVENTION

The present invention relates to an architecture, a system and a method for communicating data structures between networked devices. More specifically, this invention relates to an architecture, system and method for communicating data structures between devices that are networked with an IEEE 1394 serial bus

BACKGROUND OF THE INVENTION

The IEEE standard, "IEEE Std 1394-1995 Standard For A High Performance Serial Bus," is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-1995 serial bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices. Devices can be added and removed from an IEEE 1394-1995 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space. Because of these advantages, the IEEE 1394-1995 standard provides for a unique networking structure that is capable of incorporating audio/video devices, media play/record devices and computing/display devices.

A diverse range of products can be implemented with the ability to connect to an IEEE 1394-1995 serial bus network. These devices can have capabilities and functionality ranging from very simple to very complex. Specifically, a variety of audio/video devices, media play/record devices and computing/display devices are capable of being linked together over an IEEE 1394-1995 serial bus networking structure to support asynchronous and isochronous data transfers between the devices.

The IEEE 1394-1995 serial bus allows a collection of devices to work together in a high bandwidth, distributed environment to maximize the overall efficiency and functionality of the network. This allows manufacturers to remove expensive pieces of functionality from one device and locate that functionality in another device on the network, instead of duplicating this functionality in all devices on the network. While some of the devices have limited functionality and are relatively inexpensive, such devices require the support and interaction of other devices in order to bring the full functionality of the devices within the network to the user.

The AV/C Digital Interface Command Set is a command set used for data transactions between consumer audio/video equipment over an IEEE 1394-1995 serial bus. Neither the IEEE 1394-1995 serial bus nor the AV/C command set provide a master-slave relationship between the devices coupled within the IEEE 1394-1995 serial bus network. Instead, both the IEEE 1394-1995 serial bus and the AV/C command set operate based on a cooperative peer-to-peer coexistence of devices within the network. Discrete AV/C command and response data packets are transferred between networked devices over an IEEE 1394-1995 serial bus in an asynchronous data stream. The AV/C command and response data packets are typically formatted according to the AV/C protocol outlined in the AV/C Digital Interface Command Set. Transfers of AV/C command and response data packets over the IEEE 1394-1995 serial bus network are supported by an AV/C architecture. The AV/C architecture is comprised of lists and tables that help devices create, process and/or transmit AV/C command and response data packets. The AV/C architecture includes an AV/C bulletin board subunit that is typically dedicated to a resource device subunit such as a tuner, receiver or recoding unit.

An AV/C bulletin board subunit is an information structure that is shared between devices networked over an IEEE 1394-1995 serial bus network. A resource schedule bulletin board is also an information structure that supports information shared between coupled devices within a network. The resource schedule bulletin board provides the organizational structure through which shared data is organized and communicated. The resource schedule bulletin board contains sub-boards of lists with entry descriptors that represent encoded data that can be shared between devices within the network via descriptor commands. A dedicated AV/C bulletin board subunit typically supports the information architecture between that device and all compatible posting devices within an IEEE 1394-1995 serial bus network. A posting device writes a request entry to a write enabled list within the resource schedule bulletin board specifying when it will use the resource.

Neither the IEEE 1394-1995 serial bus nor the AV/C Command Set provide a master-slave relationship between the devices coupled within the IEEE 1394-1995 serial bus network. Instead, both the IEEE 1394-1995 serial bus and the AV/C Command Set operate based on the cooperative peer-to-peer coexistence of devices within the network transmitting data formatted in accordance with the AV/C protocol. The communicating devices exchange command and response data directly with each other without the intervention of a systems resource manager. Each device or device subunit is responsible for managing scheduling affairs and storing resource requests.

Within the current AV/C protocol, resource time of a resource device is made available to any requesting control device. Within this protocol a device competing for use of a resource device can acquire the right to use the resource device by reserving the resource device, even though another client device may have previously submitted an entry to the resource schedule board requesting the resource device at the same time. Devices may modify or delete data contained within the schedule entries submitted by other requesting control devices without acknowledging to the other requesting control devices that their respective schedule entries are being or have been modified. Thus, within the current AV/C protocol there is no method to allow control devices within a network to monitor schedule data or to provide a peer-to-peer review of schedule modifications.

SUMMARY OF THE INVENTION

The method of and apparatus for communicating data structures between devices in a networking environment of the present invention is an architecture, a method and a system for monitoring data structures written to and stored in a descriptor mechanism. The invention is particularly useful for monitoring data structures submitted to a bulletin board subunit from networked control devices. Preferably, the control devices are networked together with an IEEE 1394-1995 serial bus network and the bulletin board subunit is an AV/C resource bulletin board subunit that is dedicated to a resource device, such as a VCR or other audio video device. The data structures are preferably resource schedule entries, or portions thereof, posted to acquire resource time from a resource subunit of the resource device.

Each schedule entry stored to the AV/C resource bulletin board subunit specifies the node address of the requesting control device, the resource subunit that is being requested and the time or times that the resource is being scheduled. According to the current invention, schedule entries are monitored for access activity after being stored to the AV/C resource schedule bulletin board subunit by an original requesting control device. In the event that the schedule entry is accessed by a competing control device after it has been stored to the resource schedule bulletin board, a notify response is sent to the node address of the original requesting control device which notifies the original requesting control device that the schedule entry has been accessed by the competing control device.

Preferably, the original requesting control device specifies the data structure or data structures within the schedule entry that are to be monitored. The original requesting control device specifies the data structures that are monitored by providing a corresponding notify command with the schedule entry when the resource request is submitted to the AV/C resource schedule bulletin board. However, it is considered to be within the scope of the invention that the original requesting control device also submits notify commands to the resource schedule bulletin board at any time that schedule entries are stored in the AV/C resource schedule bulletin board subunit of the resource device. It is also preferable that requesting control devices specify the type of access activity that is to be monitored. For example, when a requesting control device submits a write notify command with a schedule entry, then the schedule entry is monitored for write access activity by competing control devices. In the event that a competing control device writes data or deletes portions of the specified data structure within the schedule entry, then a write notify response is sent to the node address of the requesting control device. Similarly, when a requesting control device submits a read notify command with a schedule entry, then the schedule entry is monitored for read access activities by competing control devices. In the event that a competing control device reads the specified data structure within the monitored schedule entry, then a read notify response is be sent to the node address of the requesting control device.

According to another embodiment of the present invention, schedule entries are automatically monitored for access activity that is performed by competing control control devices. Anytime that a competing control device reads a schedule entry, writes to a schedule entry or otherwise modifies a schedule entry that is stored in the AV/C resource schedule bulletin board subunit, a notify response is sent to the original requesting control device to notify the original requesting control device that the schedule entry has been accessed. The original requesting control device is provided an opportunity to review any modifications made to the schedule entry by the competing control device.

A notify command data frame, according to the present invention, contains a data field that captures the address of a competing device that accesses the specified data field of the monitored schedule entry. Further, the notify command data frame contains a data field that captures portions of the specified data structure accessed by the competing control device and provides codes representative of the access activity performed by the competing device. The data contained within the notify command frame is preferably stored in the memory unit of the AV/C resource bulletin board subunit to provide a detailed history of the schedule entry and access activities relating thereto.

A notify response data frame of the present invention provides an alert message to an original requesting control device when the specified data structure of a monitored schedule entries is accessed by a competing control device. According to an alternative embodiment of the present invention, a notify response command also provides the original requesting control device with information about a competing control device and access activity performed on the monitored schedule entry. Accordingly, notify response data frames contain data fields that post the node address of the competing control device and portions of the specified data structure accessed or modified by the competing control device.

BRIEF DESCRIPTION OF THE DRAWINGS

FIG. 7b illustrates a competing control deleting a portion of the schedule entry posted by the original requesting control device in FIG. 7a.

FIGS. 8a-b show write notify command frames submitted to an AV/C resource schedule bulletin board subunit according to the present invention.

FIGS. 9a-b show read notify command frames submitted to an AV/C resource schedule bulletin board subunit according to the present invention.

DETAILED DESCRIPTION OF A PREFERRED EMBODIMENT

Figure 1:
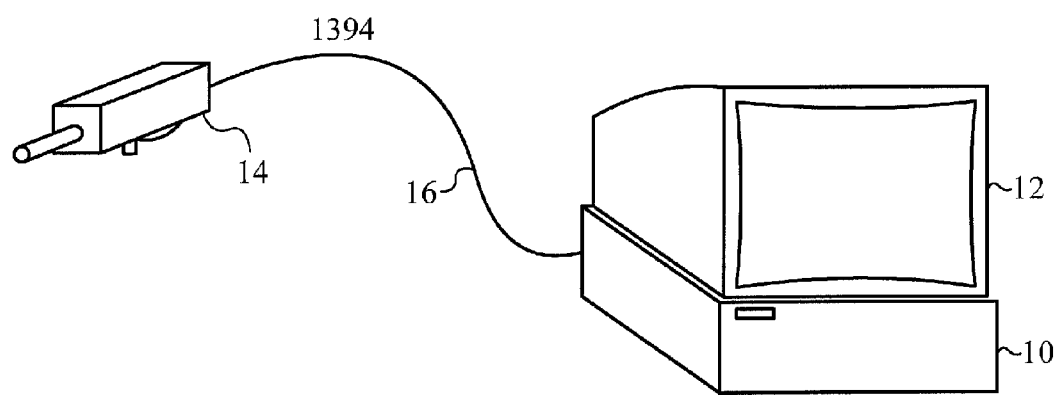
FIG. 1 illustrates a block diagram of an exemplary IEEE 1394-1995 serial bus network including a computer system and a video camera.

A block diagram of an exemplary IEEE 1394-1995 serial bus network including a computer system and a video camera is illustrated in FIG. 1. The computer system 10 includes an associated display 12 and is coupled to the video camera 14 by the IEEE 1394-1995 serial bus cable 16. Video data and associated data are sent between the video camera 14 and the computer 10 over the IEEE 1394-1995 serial bus cable 16.

Figure 2:
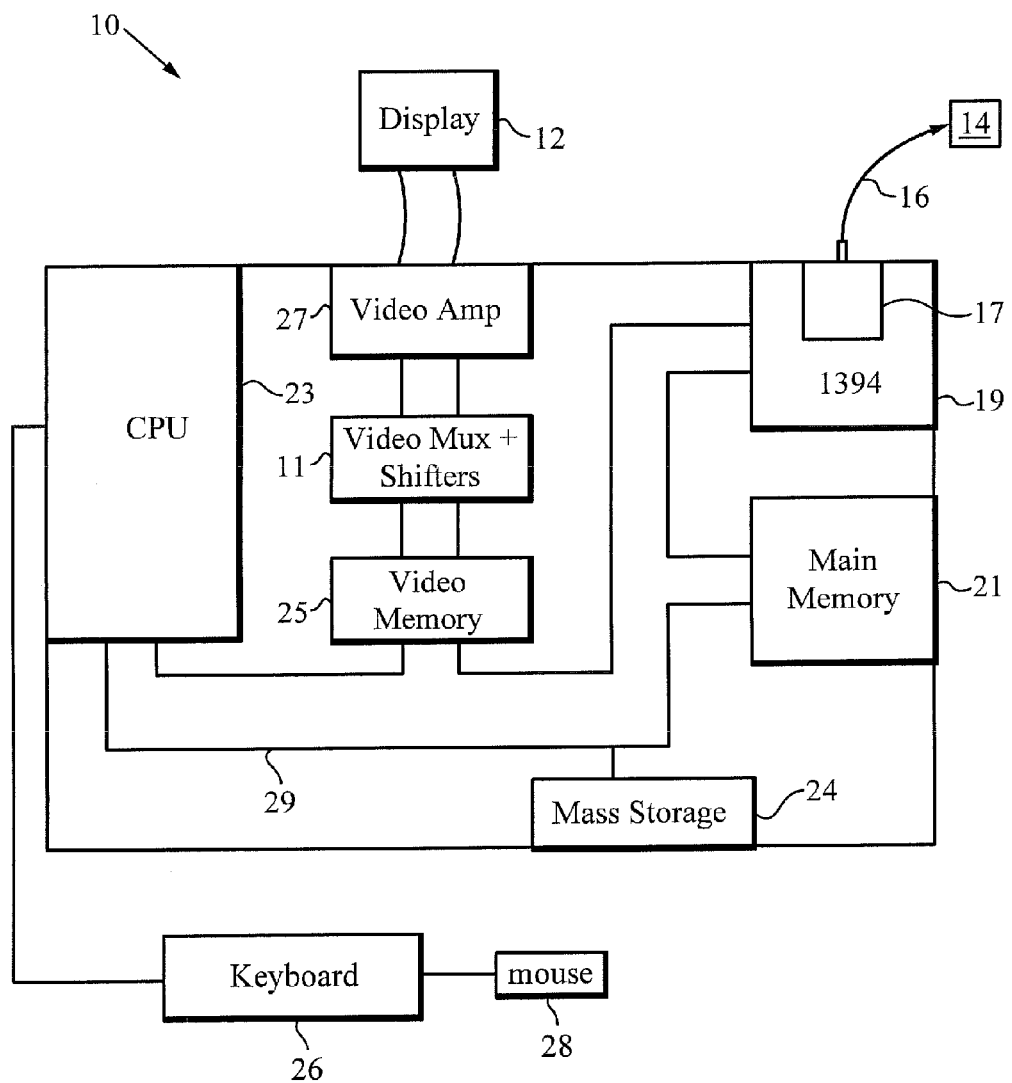
FIG. 2 illustrates a block diagram of the internal components of the computer system 10.

A block diagram of the internal components of the computer system 10 is illustrated in FIG. 2. The computer system 10 includes a central processor unit (CPU) 23, a main memory 21, a video memory 25, a mass storage device 24 and an IEEE 1394-1995 interface circuit 19, all coupled together by a conventional bidirectional system bus 29. The interface circuit 19 includes the physical interface circuit 17 for sending and receiving communications over the IEEE 1394-1995 serial bus. The physical interface circuit 17 is coupled to the camera 14 over the IEEE 1394-1995 serial bus cable 16. In the preferred embodiment of the present invention, the interface circuit 19 is implemented on an IEEE 1394-1995 interface card within the computer system 10. However, it should be apparent to those skilled in the art that the interface circuit 19 can be implemented within the computer system 10 in any other appropriate manner, including building the interface circuit onto the motherboard itself. The mass storage device 24 may include both fixed and removable media using any one or more of magnetic, optical or magneto-optical storage technology or any other available mass storage technology. The system bus 29 contains an address bus for addressing any portion of the memory 25 and 21. The system bus 29 also includes a data bus for transferring data between and among the CPU 23, the main memory 21, the video memory 25, the mass storage device 24 and the interface circuit 19.

The computer system 10 is also coupled to a number of peripheral input and output devices including the keyboard 26, the mouse 28 and the associated display 12. The keyboard 26 is coupled to the CPU 23 for allowing a user to input data and control commands into the computer system 10. A conventional mouse 28 is coupled to the keyboard 26 for manipulating graphic images on the display 12 as a cursor control device.

A port of the video memory 25 is coupled to a video multiplex and shifter circuit 11, which in turn is coupled to a video amplifier 27. The video amplifier 27 drives the display 12. The video multiplex and shifter circuitry 11 and the video amplifier 27 convert pixel data stored in the video memory 25 to raster signals suitable for use by the display 12.

Figure 3:
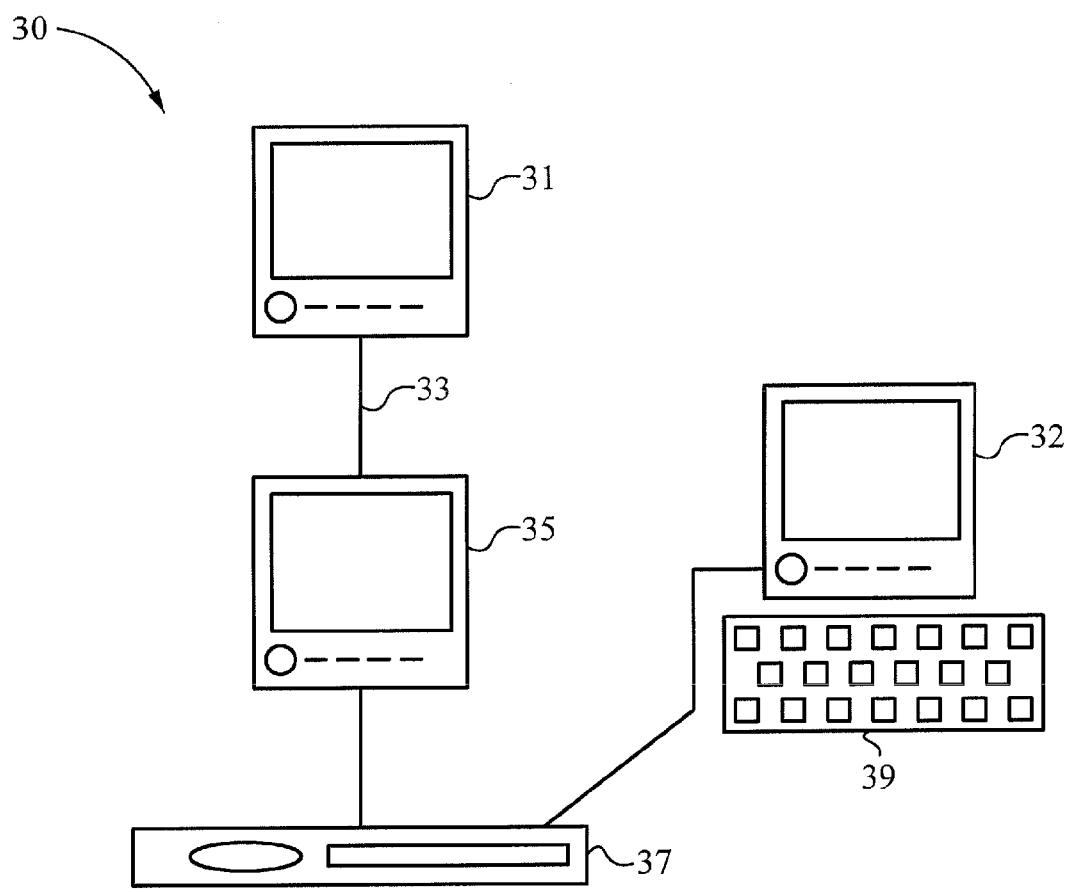
FIG. 3 illustrates a block diagram of a network system within an IEEE 1394-1995 Serial Bus Network according to the present invention.

FIG. 3 illustrates a system of devices 30 coupled within an IEEE 1394-1995 serial bus 33 according to the present invention. The video monitoring devices 31 and 35 are audio/video devices and are coupled to a video recording and media playing device 37 by the IEEE 1394-1995 serial bus 33, as shown. A computing unit 32 is also coupled to the video recording and media playing device 37 by the IEEE 1394-1995 serial bus 33. When a user enters a scheduling request to the computer system 32, the computer system 32 transmits appropriate scheduling request information to the resource schedule board maintained by the video recording and media playing device 37. The schedule information is stored in a posted schedule entry in an AV/C resource schedule bulletin board. FIG. 3 is illustrative only and there are number of system configurations and a diverse range of devices that can be supported within an IEEE 1394-1995 serial bus to provide point-to-point data stream transmissions. Further, there is no systems limitation that all the devices coupled within the IEEE 1394-1995 serial bus need to be used in order to practice the invention.

Figure 4:
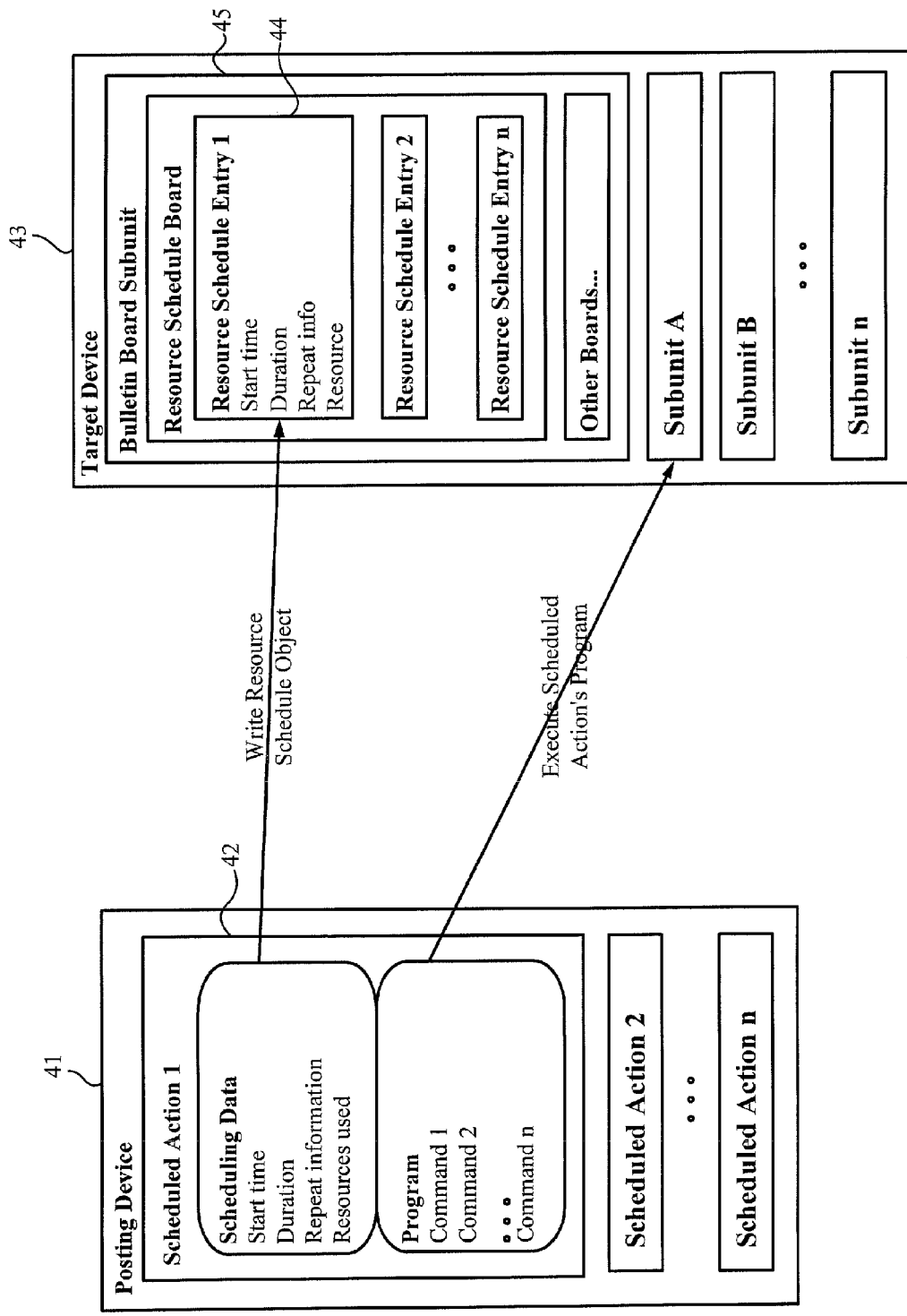
FIG. 4 shows a control device schedule request and a resource device schedule entry at a target device.

FIG. 4 illustrates an exemplary network of devices including a posting device 41 and a target device 43. In an embodiment of the invention, resource schedule entries 44, as shown in FIG. 4 contain schedule information for resources. Resource request entries are generated from networked client or scheduling devices 41 using any suitable method known in the art, such as a scheduling protocol supplied with a typical VCR device. The resource request entries are used by a target device 43 which includes the bulletin board subunit including a resource schedule board (RSB) 45 to build a resource schedule according to resource times that are allocated to various resource subunits for the requesting networked client devices. In one embodiment of the current invention, the scheduling data and scheduling architecture is transparent to the user and provides information to coordinate data transfer between devices at a systems level. In another embodiment of the current invention scheduling data and resource schedules are accessible to the users over the network. In further embodiments of the invention, viewable scheduling menus and resource schedules are generated by a graphical user interface. A schedule entry is generated by entering schedule data into a scheduling menu and submitting the data as a resource request from the posting device 41 to the target device 43 over the network. Resource requests for all the requesting client devices are stored in a memory unit at a central location and the graphical user interface generates viewable resource schedules therefrom. The internal data structure and the graphical interface used for supporting the scheduling menus is application and device dependent.

Again referring to FIG. 4, resource requests are made by entering schedule data including a start time and date, a duration time, repeat information including an interval value and a number of events value, if appropriate, and a resource indicator in the resource request entry box 42. A resource request containing the scheduling data shown in the box 42 is submitted over the network and transferred to or used to make a new resource schedule entry 44. The resource schedule board 45 includes one or more entries 44, each representing a received resource request and specification indicating that the posting device intends to utilize the resource device according to the information specified in the resource schedule entry 44. In accordance with an alternative embodiment described above, field values in the resource schedule entries 44 are used to provide a graphical user interface with scheduling data needed to generate a resource schedule accessible over the network.

Figure 5:
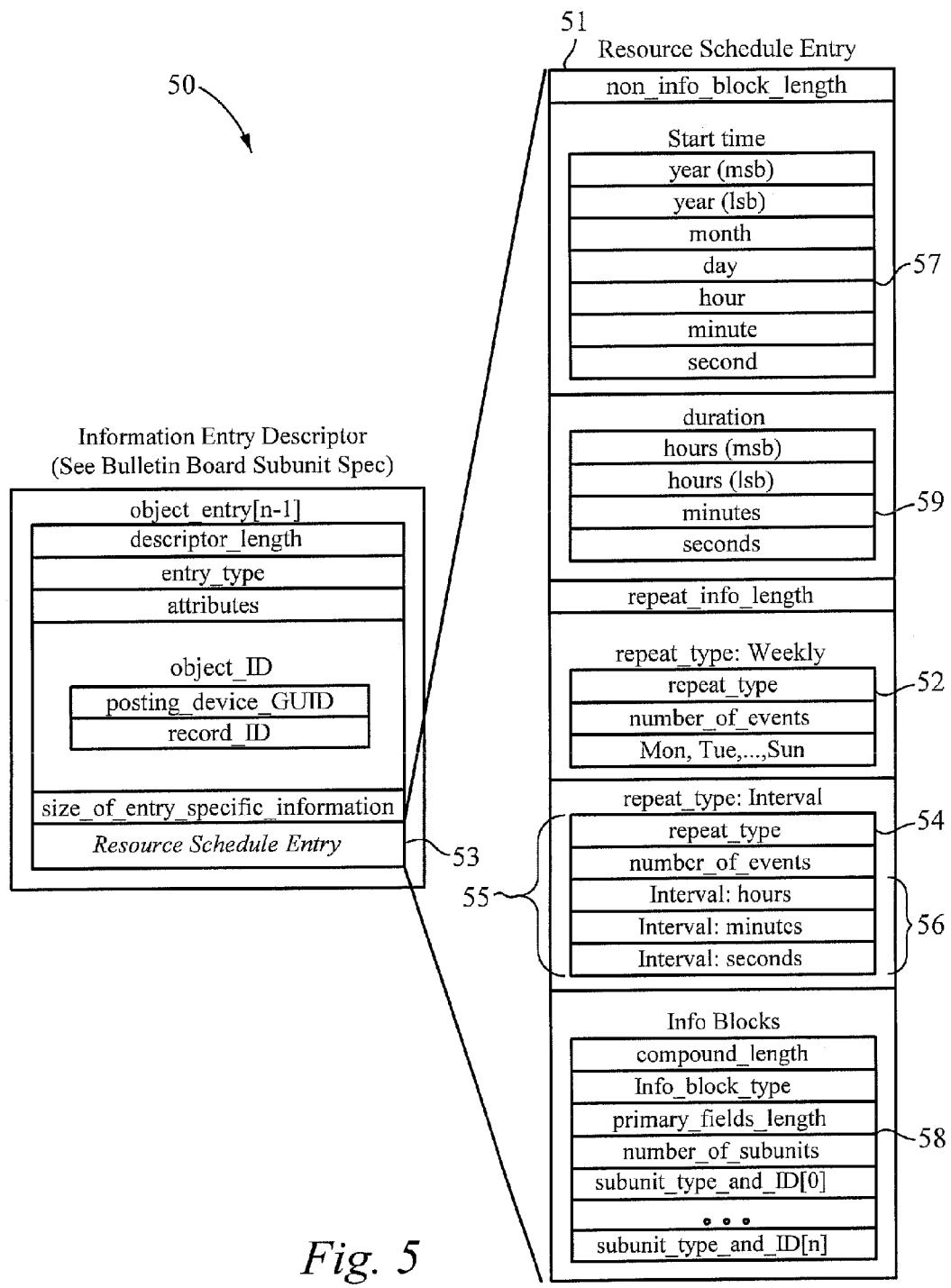
FIG. 5 shows a detailed resource schedule sub-entry.

FIG. 5 illustrates a view 50 of a high level schedule entry section 51 detailing the schedule entries that are input from a posting or scheduling device to provide a complete resource request. The start time is input in the entry block 57, the duration time is input in the entry block 59, and resource device information is input in the entry block 58. The repeat-time sequences are input in the entry blocks 55 and 52. Only one of the entry blocks 55 and 52 will be used in each entry, as appropriate. The entry block 52 is used for resource schedule entries to be repeated on a weekly basis. The entry block 55 is used for resource schedule entries to be repeated on a specific interval basis.

In order to specify the repeat-time sequence entries, a number of events value and a repeat interval are required. The number of events value can be equal to any appropriate number, including one, and specifies the number of times the entry is to be repeated. The repeat interval is the time between events and can be daily, weekly, monthly or any appropriate interval. For example, in the entry block 52, intervals such as daily, weekly or monthly are input along with a number in the number_of_events field which specifies the number of events value and represents the number of times that the request is to be executed, and thus defines the overall duration. Also, certain days of the week can be blocked out or not included within the schedule. By blocking out dates within an overall duration, the resource can be more efficiently used by other client devices. For example, a schedule request can contain field values that indicate a resource is needed every day for two weeks except for Tuesday of the second week. Thus, by viewing the resource schedule, other client or scheduling devices can see that the resource is available on that Tuesday and schedule resource time accordingly. It is convenient to provide day selections such as Monday, Thursday etc., as shown in block 52, wherein when a user schedules the resource for a particular day, the resource will automatically be scheduled for that selected day for the overall duration of the schedule entry.

The entry block 55 shows an entry form used for resource schedule entries to be repeated on a specific interval basis. In the entry line 56 a time interval is input, which is either a regular time interval (such as an hour or a day) or an irregular time interval that does not follow a naturally repeating block of time. On the entry line 54, the number of events value is input specifying the number of times the resource request is to be executed. For example, if a user inputs a schedule entry with an interval value corresponding to one hour and 20 minutes and a number of events value equal to nine, then the shared resource will be scheduled for nine one hour and 20 minute intervals, starting at a time specified in the entry block 57, with a duration as specified in the duration entry block 59.

The time data fields for resource requests and schedule entries are chosen to reflect appropriate application of the system. For example, when scheduling audio/video equipment for home or entertainment it is typically sufficient to specify the hours, minutes and seconds of the request such as those shown in block 59. However, there are particular applications where the time data fields need to be expanded to encompass greater or smaller increments of time. For example, an astronomical study of deep space, may require that audio/video equipment be scheduled for very precise periods of time over the course of a year or more. Therefore, the time data fields that are shown in blocks 57 and 59 are only exemplary and it is understood that they can be expanded to encompass any increment of time that is suitable for the application at hand.

Figure 6:
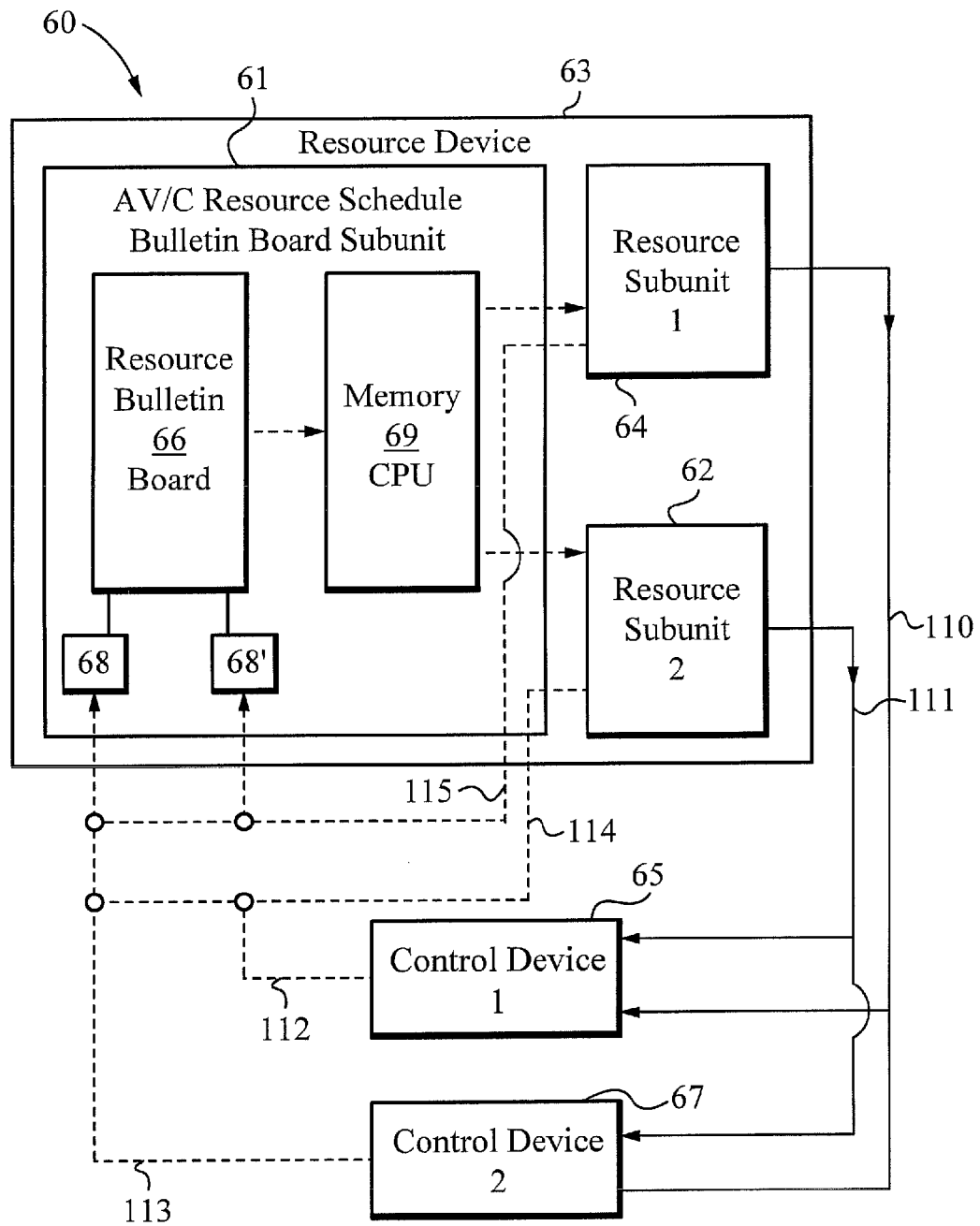
FIG. 6 illustrates a block diagram of a system with control devices capable of posting schedule entries to an AV/C bulletin board subunit of a coupled resource device.

FIG. 6 illustrates a system 60 with a resource device 63, two posting control devices 65 and 67 and an AV/C bulletin board subunit 61 according to the present invention. The solid lines 110 and 111 represent lines of content transmission from the resource subunits 62 and 64, respectively. The dashed lines 112, 113, 114 and 115 represent lines of control data transmission from the control devices 65 and 67 and from the resource subunits 62 and 64 to the AV/C resource schedule board subunit 61. The AV/C resource schedule board subunit 61 has an AV/C bulletin board 66 and a memory/CPU unit 69, wherein schedule entries and scheduling data is organized and stored. Control devices 65 and 67 submit resource requests 68 and 68' to the resource schedule bulletin board 66, where the requests are organized and posted as schedule entries and stored in the memory 69 of the subunit 61. Organized schedule entries within the AV/C resource schedule bulletin board provide a resource calendar. Resource time from each of the resource subunits 62 and 64 is allocated to the requesting control devices 65 and 67 according to the resource schedule calendar.

Again referring to FIG. 6, the AV/C bulletin board subunit 61 is preferably transparent to the user and the schedule calendar is updated or modified at the systems level. However, it is considered to be within the scope of the present invention that the AV/C bulletin board subunit 61 is supported by a graphical user interface program (not shown) that provides for direct user participation with device scheduling.

Still referring to FIG. 6, the resource requests 68 and 68' submitted by the control client devices 65 and 67 are accompanied with corresponding notify commands. According to a preferred embodiment of the present invention, the notify commands instruct the resource schedule bulletin board subunit 61 to monitor schedule entries posted to the bulletin board 66 and stored in the memory unit 69.

Figure 7A:
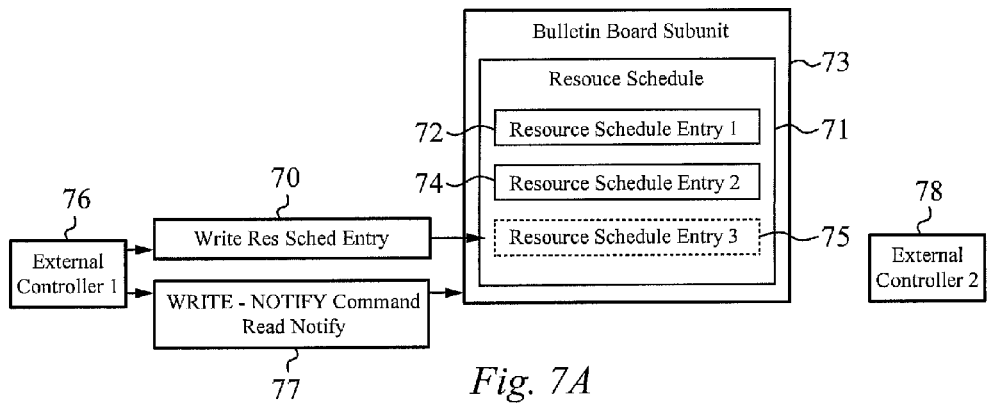
FIG. 7a illustrates a requesting control device submitting a schedule entry with a write notify command to an AV/C resource schedule bulletin board subunit according to the present invention.

FIG. 7 shows a system with a requesting control device 76 and a competing control device 78. The requesting control device 76 and the competing control device 78 are both capable of posting schedule entries, such as those illustrated by blocks 72 and 74, to the resource schedule bulletin board 73. The bulletin board subunit 73 is preferably an AV/C resource schedule bulletin board subunit that is dedicated to an audio/video resource device, such as described in FIG. 6. The bulletin board subunit 73 has a memory unit (not shown) for storing the posted schedule entries 72, 73 and 75. Each of the schedule entries 72, 73 and 75 contain data fields with data that identifies the requesting control device, specifies a resource subunit being scheduled and the time or times that the resource subunit is being requested.

Again referring to FIG. 7a, the requesting control device 76 submits a resource request 70 over a network to the bulletin board 71 where the request 70 is posted as the schedule entry 75. Preferably, the original requesting control device 76 and the competing control device 78 are coupled to the node including the bulletin board subunit 73 by an IEEE 1394-1995 serial bus. According to the present invention, the requesting control device 76 submits a corresponding notify command 77 with the schedule request 70 to the bulletin board subunit 73 instructing the bulletin board subunit 73 to monitor the schedule entry 75 for a specified access activity.

Figure 7B:
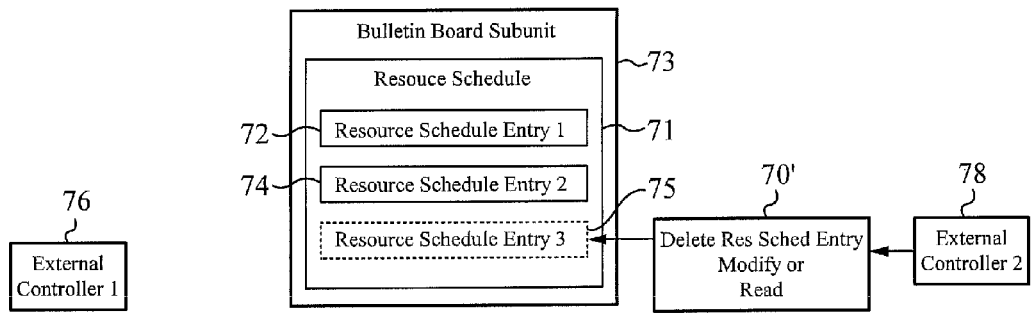

Now referring to FIG. 7b, the competing control device 78 accesses the schedule entry 75 and performs an access activity 70'. The access activity 70' includes either deleting the schedule entry 75, reading the schedule entry 75 or otherwise modifying the schedule entry 75. The bulletin board subunit 73 determines if the access activity 70' performed by the competing control device 78 is on the same descriptor specified within the notify command 77 submitted by the original requesting device 76.

Figure 7C:
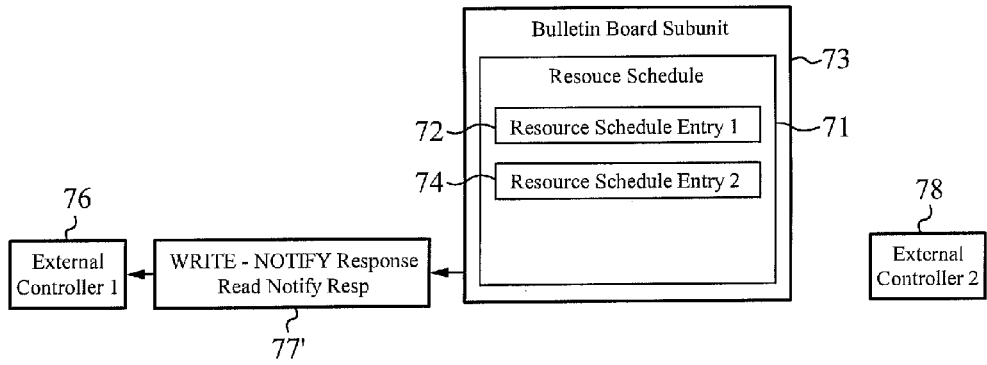
FIG. 7c illustrates the AV/C resource schedule bulletin board subunit sending a write notify response to the original requesting control device according to the present invention.

Now referring to FIG. 7c, if the access activity 70' performed by the competing control device 78 is on the same descriptor that is specified by the notify command 77, then the bulletin board subunit 73 sends a response notify command 77' to the requesting control device 76. The response notify command 77' informs the control device 76 that the schedule entry 75 has been accessed by a competing device 78. According to an embodiment of the present invention, the notify response 77' provides data that specifies the access activity 70' performed by the competing control device 78 and identifies the node address of the competing control device 78 within the network.

Again referring to FIG. 7a, according to the preferred embodiment of the invention the requesting control device 76 submits a notify command 77 to a bulletin board subunit 73 concurrently with a corresponding schedule request 70. While it is preferred that the notify command 77 is submitted immediately after the resource request 70, it is considered to be within the scope of the current invention that the notify command 77 is submitted to the bulletin board subunit 73 at any time during the time period that the schedule entry 75 is stored or maintained within the subunit 73.

The write notify command preferably has the following format:

WRITE DESCRIPTOR, ctype=NOTIFY

A read notify command preferably has the following format:

READ DESCRIPTOR, ctype=NOTIFY

As described herein, both the write notify command and the read notify command are submitted to a descriptor mechanism, such as the bulletin board subunit, by an original requesting device. If a competing control device then accesses the specified descriptors, the descriptor mechanism notifies the original requesting device, in response to the write or read notify command.

Schedule entries, such as those described in FIGS. 4 and 5, contain descriptor data structures and information data structures. Descriptor data structures provide data that specifies the requesting control device or the resource subunit that is being scheduled. The information data structures provide data that specifies the schedule action such as the start time and the duration time. It is preferred that notify commands submitted with schedule requests according to the present invention specify the data structure being monitored within the corresponding schedule entry. Thus, according to the preferred embodiment of the present invention, both the access activity monitored and the data structure monitored are specified by the notify command.

FIG. 8a illustrates a write descriptor notify command frame 80 in accordance with the present invention. The command frame 80 is submitted to a bulletin board subunit with a schedule request and instructs the bulletin board subunit to monitor a specified descriptor data field contained within the corresponding schedule entry for write access activity by a competing control device. The descriptor data of the specified descriptor data field is duplicated within the descriptor_specifier data field 81 of the notify command frame 80. The subfunction data field 83 contains data that encodes for the type of write access activity that was performed on the descriptor data by the competing control device. For example, when descriptor data is changed, replaced, inserted, deleted, partially replaced or any combination thereof, by the competing control device, the subfunction data field 83 within the notify command frame 80 will provide the data that encodes for the activity. The node_ID data field 82 provides identification data of the competing control device that has accessed the specified descriptor data. The data_length data field 84 codes the command frame 80 for a change in the length of the descriptor data within the specified descriptor data field as a result of the write access activity performed by the competing control device and the address data field 79 provides data that codes for the descriptor address where the change occurred.

FIG. 8b, illustrates a write information block notify command frame 85 in accordance with the present invention. Similar to the command frame 80, illustrated in FIG. 8a, the command frame 85 is submitted to a bulletin board subunit with a resource request and instructs the bulletin subunit to monitor a specified information data field contained within the corresponding schedule entry for a write access activity by a competing control device. The information data of the specified information data field is duplicated within the info_block_reference_path data field 87 of the notify command frame 85. The subfunction data field 89 contains data that encodes for the type of write access activity that was performed on the information data by a competing device. For example, when information data is changed, replaced, inserted, deleted, partially replaced, or any combination thereof, by the competing control device, the subfunction data field 89 will provide the data that encodes for the type of write access activity performed by the competing control device. The node_ID data field 86 provides identification data of the competing control device that accessed the specified information data field. The data_length field 88 codes the command frame 85 for a change in the length of the information data within the specified information data field as a result of the write access activity performed by the competing control device and the address data field 189 provides data that codes for the descriptor address corresponding to the location where the write activity began.

FIG. 9a, illustrates a read descriptor notify command frame 90 in accordance with the current invention. The command frame 90 is submitted to a bulletin board subunit and instructs the bulletin subunit to monitor a specified descriptor data field contained within a corresponding schedule entry for read access activity by a competing control device. The descriptor data of the specified descriptor data field is duplicated within the descriptor_specifier data field 91 of the notify command frame 90. The node_ID data field 93 provides identification data of the competing control device that accessed the specified descriptor data field. The data_length field 92 codes the command frame 90 for the portion of the descriptor data within the specified descriptor data field that was read by the competing control device and the address data field 94 provides the descriptor address corresponding to the starting location of the read activity.

FIG. 9b, illustrates a read information block notify command frame 95 in accordance with the current invention. Similar to the command frame 90 illustrated in FIG. 9a, the command frame 95 is submitted to a bulletin board subunit along with a resource request and instructs the bulletin board subunit to monitor a specified information data field contained within the corresponding schedule entry for a read access activity performed by a competing control device. The information data of the specified information data field is duplicated within the info_block_reference_path data field 97 of the notify command frame 95. The node_ID data field 99 provides identification data of the competing control devices that access the specified information data field. The data_length field 96 codes the command frame 95 for the portion of the information data within the information data field that was read by the competing control device and the address data field 98 provides the descriptor address corresponding to the starting location of the read activity.

Figure 10:
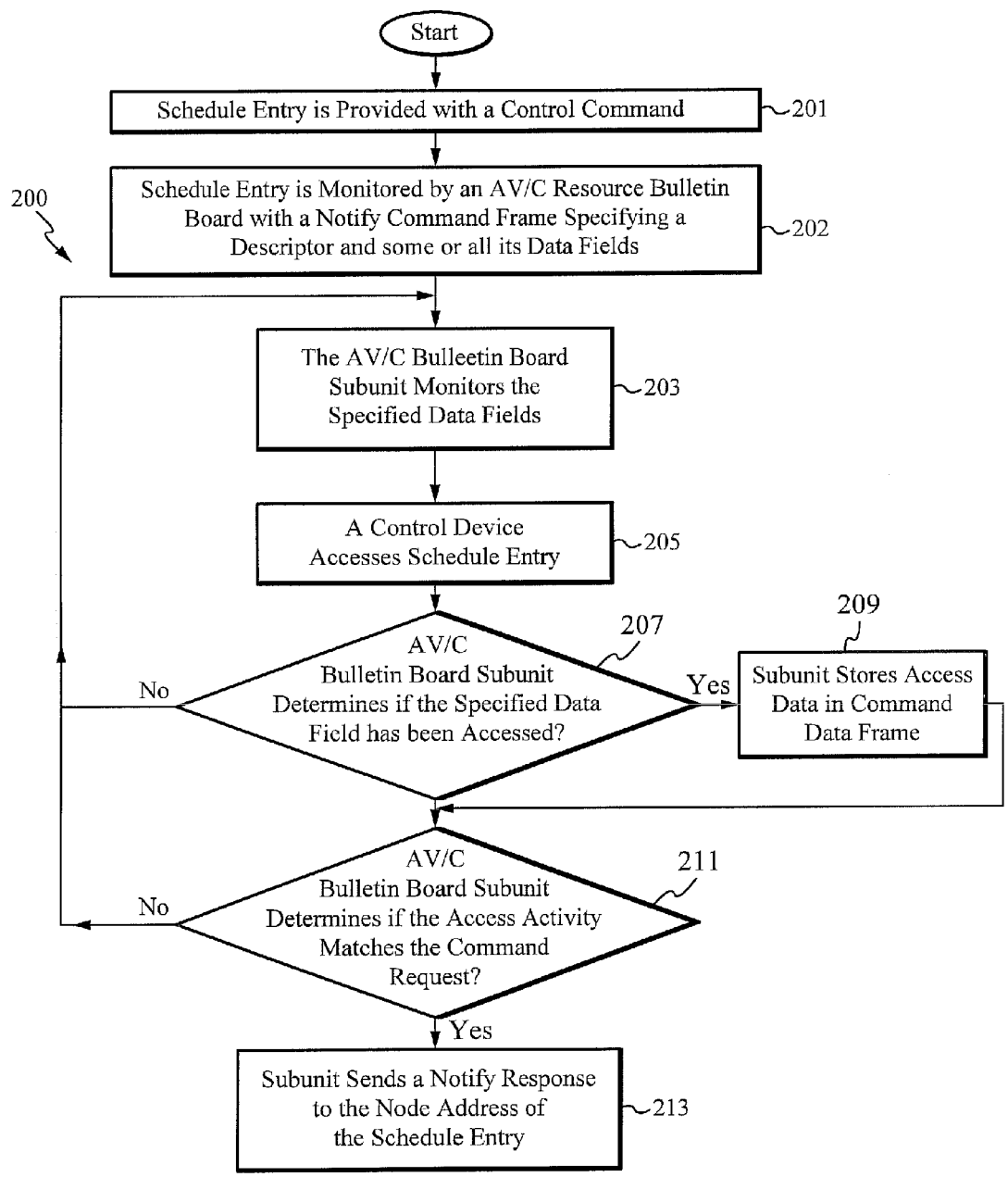
FIG. 10 illustrates a flow diagram for monitoring a schedule data structure according to the preferred embodiment of the present invention.

FIG. 10 is a block-flow diagram 200 according to the method of the preferred embodiment of the present invention. In the step 201, a schedule entry is provided with a control command by an original requesting control device to an AV/C schedule bulletin board subunit. In the step 202, the original requesting control device then specifies a data field or data block within the schedule entry to be monitored for access activity performed by competing control devices by a notify write or notify read command frame, such as the notify command frames described in FIG. 8*a-b* and FIG. 9*a-b*, which is submitted to the AV/C schedule bulletin board subunit. The data field to be monitored is preferably specified within this notify command frame. It is also preferable that the notify command is submitted immediately after the schedule request is submitted to the bulletin board subunit. In the step 203, the bulletin board subunit monitors the specified data field within the schedule entry until after the first change to the descriptor. When a competing control device accesses the schedule entry in the step 205, then in the step 207 the bulletin board subunit determines if the competing device has accessed the specified data field in the manner for which the entry is being monitored. If the bulletin board subunit determines that the specified data field has not been accessed, then the bulletin board subunit returns to the step 203 and the bulletin board subunit continues to monitor the specified data field. If, at the step 207 the bulletin board subunit determines that a competing device has accessed the specified data field, then in the step 209 access data is stored to the subunit memory and the access activity is posted to the notify command frame. Preferably, the access data includes the node address of the competing device and the data that has been accessed. The bulletin board subunit then determines, at the step 211, if the access activity matches the command request. If the bulletin board subunit determines that the command request does match the access activity, then, in the step 213 the bulletin board subunit sends a notify response to the node address of the schedule entry to notify the requesting control device that the schedule entry has been accessed. If the bulletin board subunit determines at the step 211 that the command request does not match the specified access activity, then the bulletin board subunit returns to the step 203 and continues to monitor the specified data field. Once a notify response has been sent, after an access activity by a competing control device, then the original requesting control device preferably must provide another notify command to the AV/C schedule bulletin board subunit in order to continue to monitor the specified data field.

As described herein, within the preferred embodiment of the present invention, the descriptor mechanism is the AV/C bulletin board subunit and is used to monitor access activity of specified descriptors or entries within the bulletin board subunit. However, it should be apparent to those skilled in the art that the teachings of the present invention, as described herein, can alternatively be used with any other appropriate descriptor mechanism to monitor access activity of any other appropriate descriptor.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the architecture, system and method disclosed above are only illustrative of specified embodiments of the invention. Specifically, it will be apparent to those skilled in the art that while the preferred embodiment of the present invention is used with an IEEE 1394-1995 serial bus structure, the present invention could also be implemented on any other appropriate digital interfaces or bus structures, including other or later versions of the IEEE 1394 serial bus. Also, the data frame format described for notify commands utilized in the present invention may have any varying degree of complexity depending on the application at hand.

What is claimed is:

1. An architecture implemented on a computing device for scheduling a shared resource within a network for a plurality of devices, the architecture comprising:
   a) a means for receiving resource requests submitted over the network from the devices;
   b) a means for generating schedule data comprising starting times, duration times and repeat-time sequences;
   c) a means for generating and maintaining a subunit resource use schedule and a schedule entry menu; and
   d) a means for submitting the schedule data over the network to generate a subunit resource use schedule, the subunit resource use schedule configured to be accessible to the plurality of devices over the network, wherein the schedule data is organized and stored in an AV/C bulletin board, and further wherein the subunit resource use schedule allocates use of the shared resource.

2. The architecture of claim 1, wherein the means for generating schedule data comprises a schedule entry menu generated by a graphical user interface.

3. The architecture of claim 2, wherein the graphical user interface further generates the resource schedule.

4. The architecture of claim 1, wherein the schedule data is configured to be accessible to the plurality of devices over the network.

5. The architecture of claim 1, wherein the schedule data further comprises a resource indicator.

6. The architecture of claim 1, wherein the means for generating schedule data comprises a control device.

7. The architecture of claim 1, wherein the network complies with a version of the IEEE 1394-1995 standard.

8. The architecture of claim 1, wherein the shared resource is a video recording and media playing device.

9. A method of scheduling and allocating a shared resource between a plurality of devices over the network, the method comprising:
   a) receiving schedule entries from posting client devices over a network, wherein the schedule entries have schedule data comprising a start time, a duration time interval and a number of events sequence, wherein the schedule data is organized and stored in an AV/C bulletin board;

b) generating a subunit resource use schedule comprising resource requests, the resource schedule configured to be accessible to the plurality of devices over the network, wherein the subunit resource use schedule allocates use of the shared resource; and c) submitting the schedule data from control devices over the network.

10. The method of claim 9, further comprising continuously updating the resource schedule based on new schedule requests.

11. The method of claim 9, further comprising continuously updating the resource schedule based upon processed resource requests.

12. The method of claim 9, further comprising resolving schedule conflicts.

13. The method of claim 9, wherein the schedule data further comprises a resource indicator.

14. The method of claim 9, wherein the resource requests are submitted by control devices.

15. The method of claim 9, wherein the network complies with a version of an IEEE 1394-1995 standard.

16. The method of claim 9, wherein the shared resource is a video recording and media playing device.

17. An architecture implemented on a computing device to schedule a shared resource within a network of a plurality of devices, the architecture comprising:
   a) a receiving module to receive resource requests submitted over the network from the devices;
   b) a schedule generating module to generate schedule data for the shared resource, the schedule data comprising starting times, duration times and repeat-time sequences;
   c) a graphical user interface to generate and maintain a subunit resource use schedule and a schedule entry menu; and
   d) a communication module to submit the schedule data over the network to the graphical user interface to generate a subunit resource use schedule, wherein the subunit resource use schedule is accessible to each of the plurality of devices over the network, further wherein the schedule data is organized and stored in an AV/C bulletin board, and further wherein the subunit resource use schedule allocates use of the shared resource.

18. The architecture of claim 17, wherein the shared resource is a video recording and media playing device.

19. An architecture implemented on a computing device for scheduling a shared resource within a network for a plurality of devices, the architecture comprising:
   a) a receiving module for receiving resource requests submitted over the network from the devices;
   b) a schedule generating module for generating schedule data for the shared resource, the schedule data comprising starting times, duration times, repeat-time sequences and a resource indicator;
   c) a graphical user interface for generating and maintaining a subunit resource use schedule and a schedule entry menu; and
   d) a communication module for submitting the schedule data over the network to the graphical user interface to generate the subunit resource use schedule,
wherein the subunit resource use schedule is accessible to each of the plurality of devices over the network, further wherein the schedule data is organized and stored in an AV/C bulletin board, and further wherein the subunit resource use schedule allocates use of the shared resource.

20. The architecture of claim 19, wherein the shared resource is a video recording and media playing device.

21. An architecture implemented on a computing device for scheduling a shared hardware resource within a network for a plurality of devices, the architecture comprising:
   a) a receiving module to receive resource requests submitted over the network from the devices;
   b) a schedule generating module for generating schedule data for the shared hardware resource, from the resource requests the schedule data comprising starting times, duration times, repeat-time sequences and a resource indicator;
   c) a graphical user interface for generating and maintaining a subunit resource use schedule and a schedule entry menu; and
   d) a communication module for submitting the schedule data over the network to the graphical user interface to generate the subunit resource use schedule,
wherein the subunit resource use schedule is accessible to each of the plurality of devices over the network, further wherein the schedule data is organized and stored in an AV/C bulletin board, and further wherein the subunit resource use schedule allocates use of the shared hardware resource.

* * * * *